Figure 1:
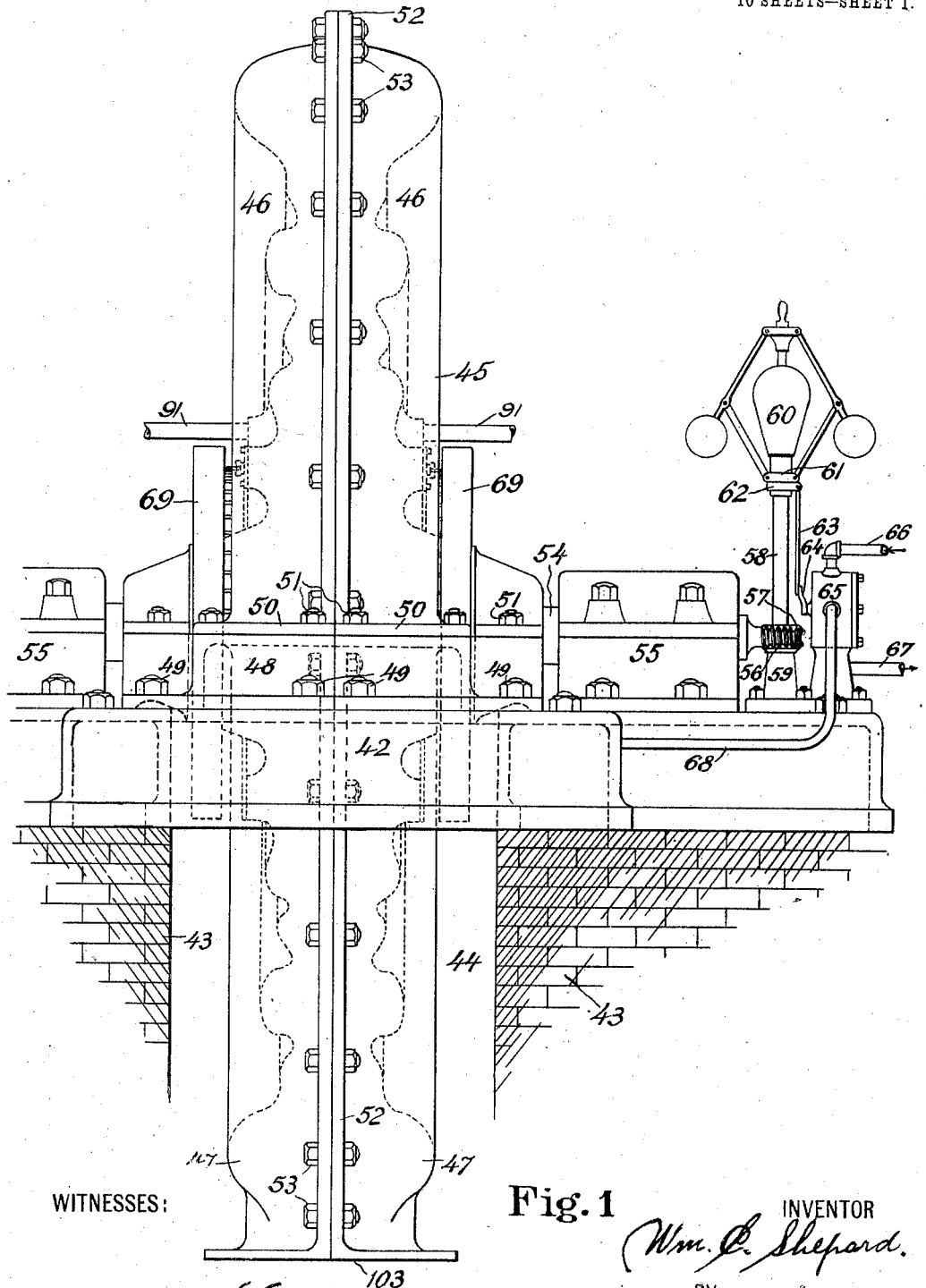

No. 811,878. PATENTED FEB. 6, 1906.
W. E. SHEPARD.
STEAM TURBINE.
APPLICATION FILED JULY 12, 1904.

10 SHEETS—SHEET 3.

Witnesses
William A. Kelly
Anna K. McCole

Inventor
Wm. E. Shepard
By Edward P. Thompson
Attorney

No. 811,878.  
PATENTED FEB. 6, 1906.  
W. E. SHEPARD.  
STEAM TURBINE.  
APPLICATION FILED JULY 12, 1904.  
10 SHEETS—SHEET 5.
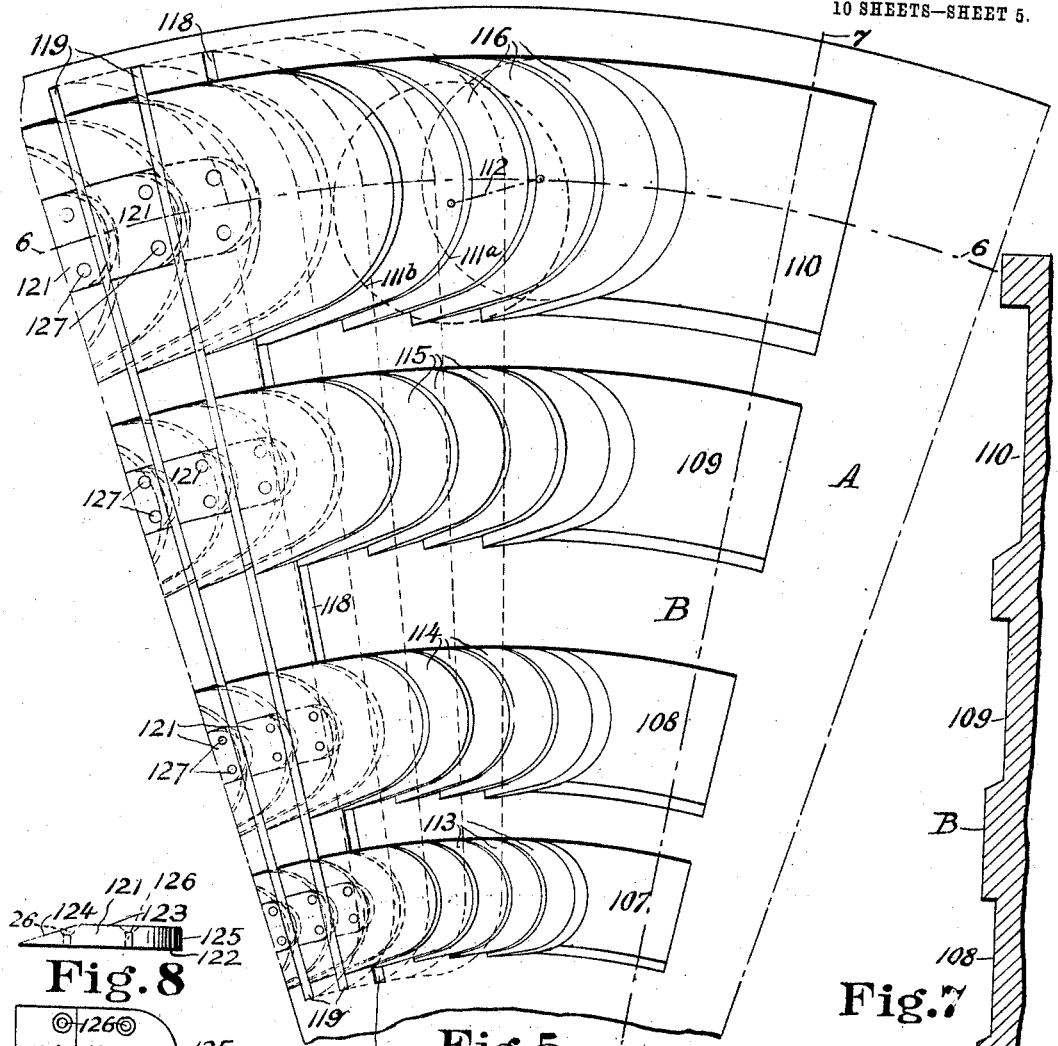
Fig.8  
Fig.9  
Fig.5  
Fig.7
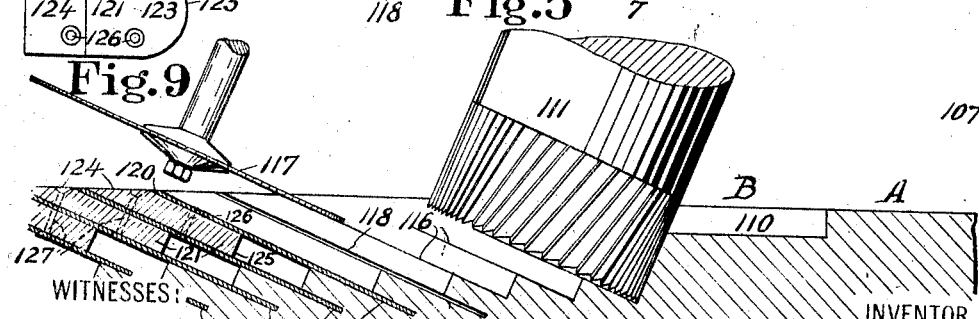
Fig.6
WITNESSES:  
William A. Kelly  
Anna R. McCole
INVENTOR  
Wm. E. Shepard  
BY Edward R. Thompson  
ATTORNEY No. 811,878. PATENTED FEB. 6, 1906.
W. E. SHEPARD.
STEAM TURBINE.
APPLICATION FILED JULY 12, 1904.
10 SHEETS—SHEET 6.
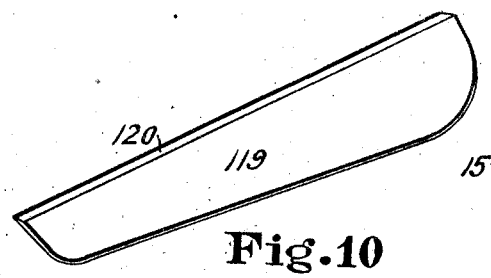
Fig. 10
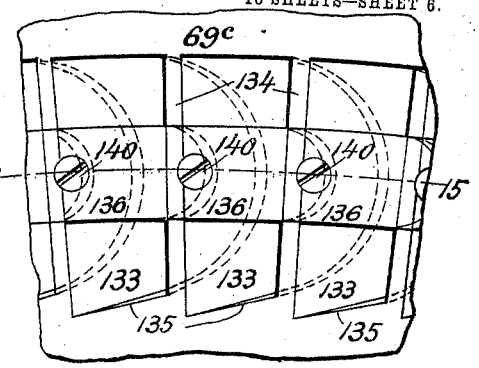
Fig. 14
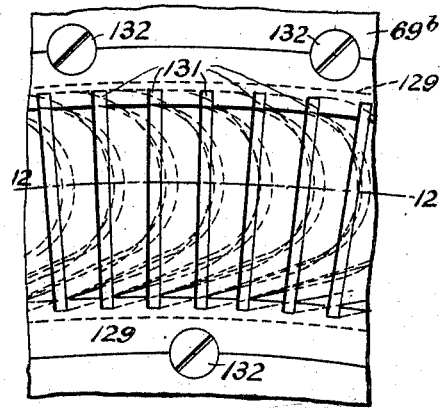
Fig. 11
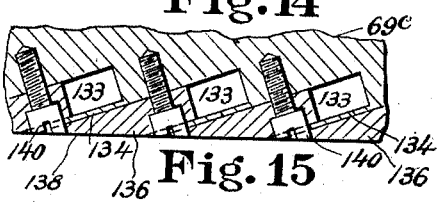
Fig. 15
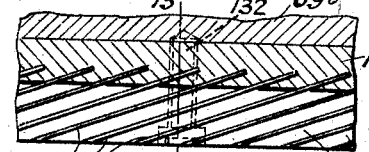
Fig. 12
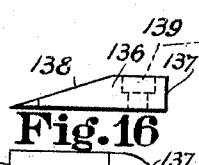
Fig. 16
Fig. 17
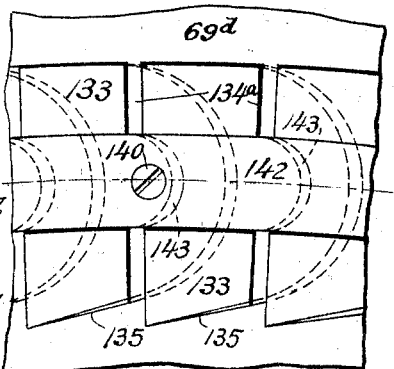
Fig. 18
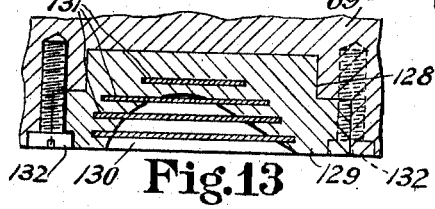
Fig. 13
Fig. 19
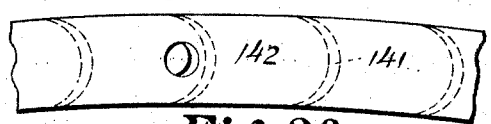
Fig. 20
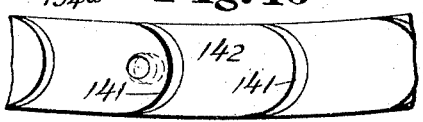
Fig. 21
WITNESSES:
William A. Kelley
Anna R. McCole
INVENTOR
Wm. E. Shepard
BY
Edward P. Thompson
ATTORNEY No. 811,878. PATENTED FEB. 6, 1906.
W. E. SHEPARD.
STEAM TURBINE.
APPLICATION FILED JULY 12, 1904.
10 SHEETS—SHEET 7.
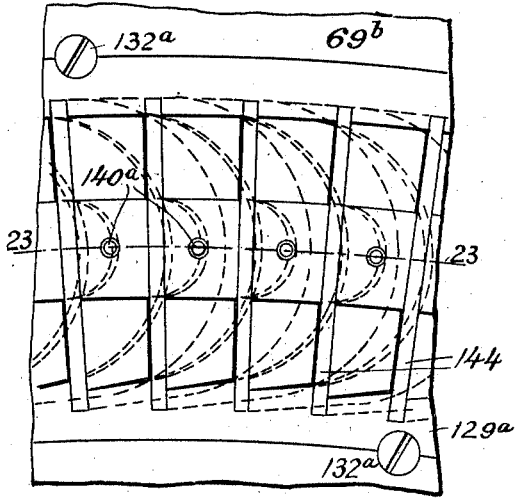
Fig. 22
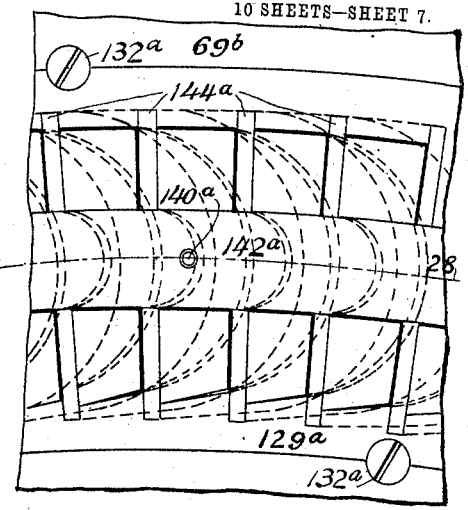
Fig. 27
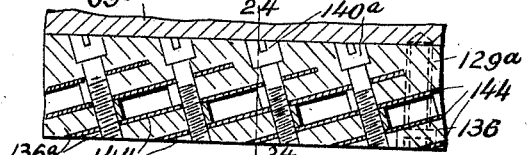
Fig. 23
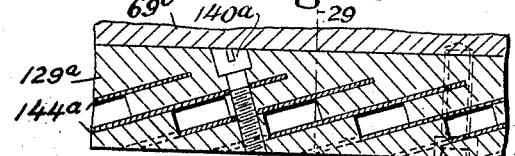
Fig. 28
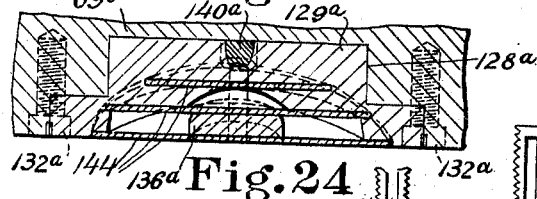
Fig. 24
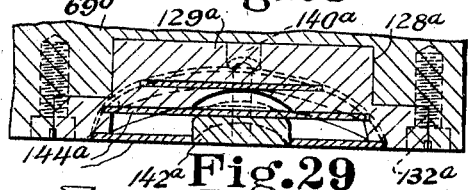
Fig. 29
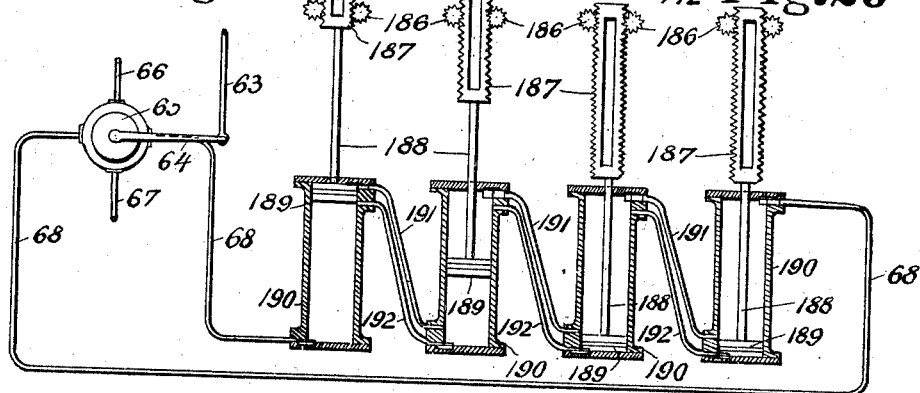
Fig. 41
Fig. 25
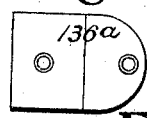
Fig. 26
WITNESSES:
William A. Kelly
Anna R. McCole
INVENTOR
Wm. E. Shepard
BY
Edward P. Thompson
ATTORNEY

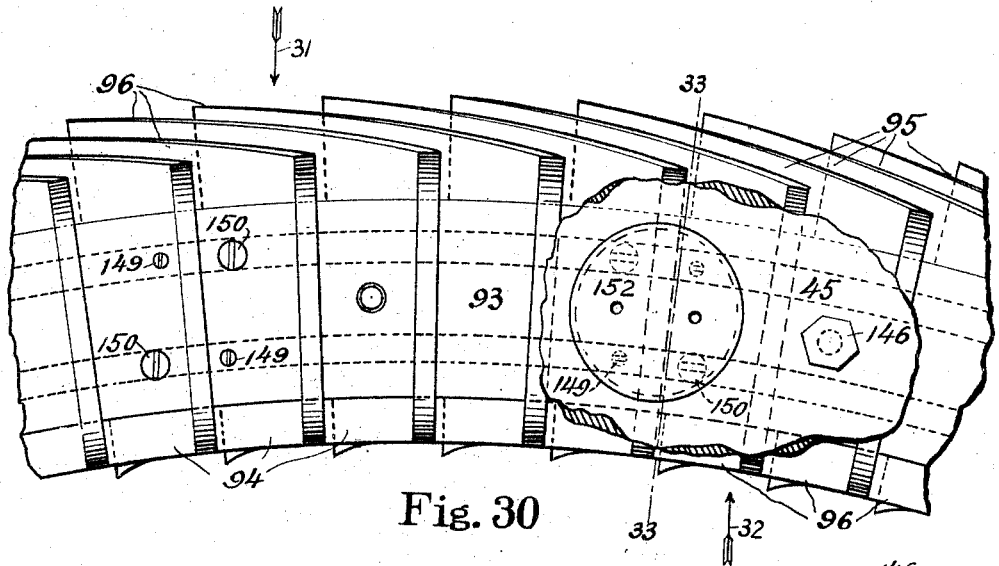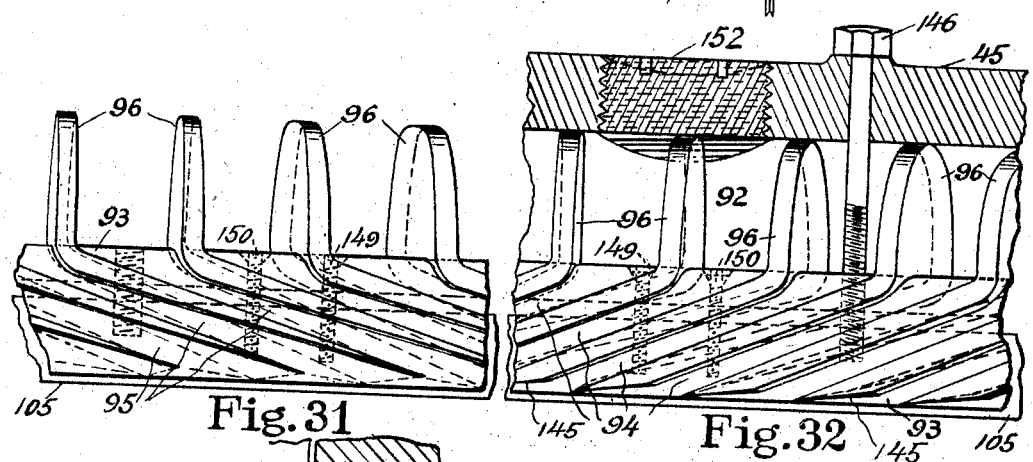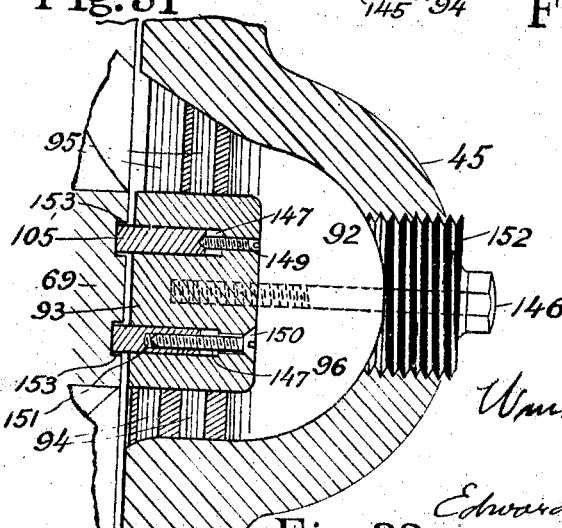

No. 811,878. PATENTED FEB. 6, 1906.
W. E. SHEPARD.
STEAM TURBINE.
APPLICATION FILED JULY 12, 1904.

10 SHEETS—SHEET 9.

WITNESSES:
William A. Kelly
Anna R. McCole

INVENTOR
Wm. E. Shepard
BY
Edward P. Thompson
ATTORNEY

No. 811,878. PATENTED FEB. 6, 1906.
W. E. SHEPARD.
STEAM TURBINE.
APPLICATION FILED JULY 12, 1904.
10 SHEETS—SHEET 10.

WITNESSES:
Wm. A. Kelly
Anna R. McCole

INVENTOR
Wm. E. Shepard
BY
Edward P. Thompson
ATTORNEY

UNITED STATES PATENT OFFICE.

WILLIAM E. SHEPARD, OF PARIS, FRANCE.

STEAM-TURBINE.

No. 811,878.   Specification of Letters Patent.   Patented Feb. 6, 1906.

Application filed July 12, 1904. Serial No. 216,274.

*To all whom it may concern:*

Be it known that I, WILLIAM E. SHEPARD, a citizen of the United States of America, and a resident of Paris, France, have invented certain new and useful Improvements in Steam-Turbines, of which the following is a specification.

My invention relates to the construction of elastic-fluid turbines, but more particularly to a turbine of the radial-flow type; and my general object is to construct a turbine so as to operate in the most reliable, easy, and economical manner.

More particularly, one object of the present invention is a turbine having but one wheel and having the elastic motive fluid so disposed that it acts more than once on the same wheel, thus permitting use of much lower velocities of rotation than are usually required by steam-turbines on the impulse type, it being known that for the economic operation of such wheels the buckets of the wheel must have a velocity equal to one-half that of the impelling fluid that strikes against it.

Another object of my invention is to facilitate the economical construction of the wheel and the other parts which heretofore have been the source of very large expense and to construct a wheel with a minimum number of parts and in a minimum number of operations.

Another object of my invention is to improve the regulation of the wheel by shutting off or turning on the motive fluid completely from one of a plurality of entrance-nozzles in such manner that all the nozzles which happen to be working are working at a maximum efficiency, and thus the efficiency of the wheel is almost uniform under varying loads and does not diminish successively at reduced loads, as is the case of other forms—as, for instance, where the steam is throttled or wire-drawn at less than full load.

Another object of my invention is to provide special governing mechanism depending generally, but not necessarily, directly upon the speed of the shaft of the turbine, this governor being completely astatic.
Another object of my invention is to provide means whereby a machine of large capacity may be built up from several of smaller capacity mounted on the same shaft. Such means embody the operation of every separate wheel except one, either at full load or completely shut off, so that in this manner that part of the total which is operating is doing so at maximum efficiency, whereas those wheels which are shut off add practically nothing to the friction of the whole, and that wheel which is being operated at part load is used to regulate the speed in accordance with variations of the load. My improved regulating mechanism is such that the several wheels forming parts of the whole are thrown on automatically and successively one by one as the load increases and turned off successively one by one as the load diminishes. By this construction another advantage is gained, that a wheel of any capacity built up from smaller wheels will operate with the same efficiency as or greater than a single wheel of large dimensions would have, so that only two or three standard designs, including sets of drawings, patterns, parts, &c., may be kept in stock for all sizes of apparatus that may be needed.

A further object of my invention is to provide a turbine absolutely without end thrust upon the shaft or parts and which leaves room for the minimum of leakage. I provide special forms of packed joints adapted to high velocities and which form a part of my invention, as hereinafter described and claimed.

My turbine is specially designed to be operated by steam as a motive fluid, and this fluid will be used in the following description of the apparatus; but it is to be understood that the wheel is adaptable to any other form of elastic or expansive fluid, such as compressed air or burning gas.

My improved wheel is of the impulse type and of that kind known as the "multiple-expansion" or "multiple-stage" turbine, the steam or other fluid being caused to undergo its expansion in several separate stages until it arrives finally at exhaust-pressure—that is to say, the first stage may embody an expansion from the admission-pressure to a certain lower pressure and the steam is ejected through an expansion-nozzle at its full velocity, due to expansion to the said lower or intermediate pressure, after which expansion it acts one or more times successively upon the wheel and then passes into a receiver in the same manner as steam from the high-pressure cylinder of a compound reciprocating engine, after which the steam leaves the receiver through a second expansion-nozzle or series of expansion-nozzles, being fully expanded in these nozzles to the pressure at the second stage of the expansion or that in the second receiver, and thereupon is caused to act one or more times upon buckets in the wheel and is then received into said second receiver, and this operation may be repeated as many times as found desirable, according to the size and style of the wheel—that is to say, the expansion may be divided into as many stages as desirable, each stage being provided with its own set of nozzles and buckets upon the surface of the same wheel—until the exhaust-chamber is reached. Furthermore, the first or high-pressure series of nozzles is closest to the axis of the wheel, whereby the steam as it expands has a greater and greater area to accommodate it according to the increasing circumference as it passes radially outward.

My invention furthermore consists of the constructions and combinations hereinafter more particularly described and claimed.

In order that my invention may be readily understood, I have hereinbelow described one embodiment and several modifications thereof, which will suffice to illustrate the principle, said forms being shown in the accompanying drawings, wherein—

Figure 2:
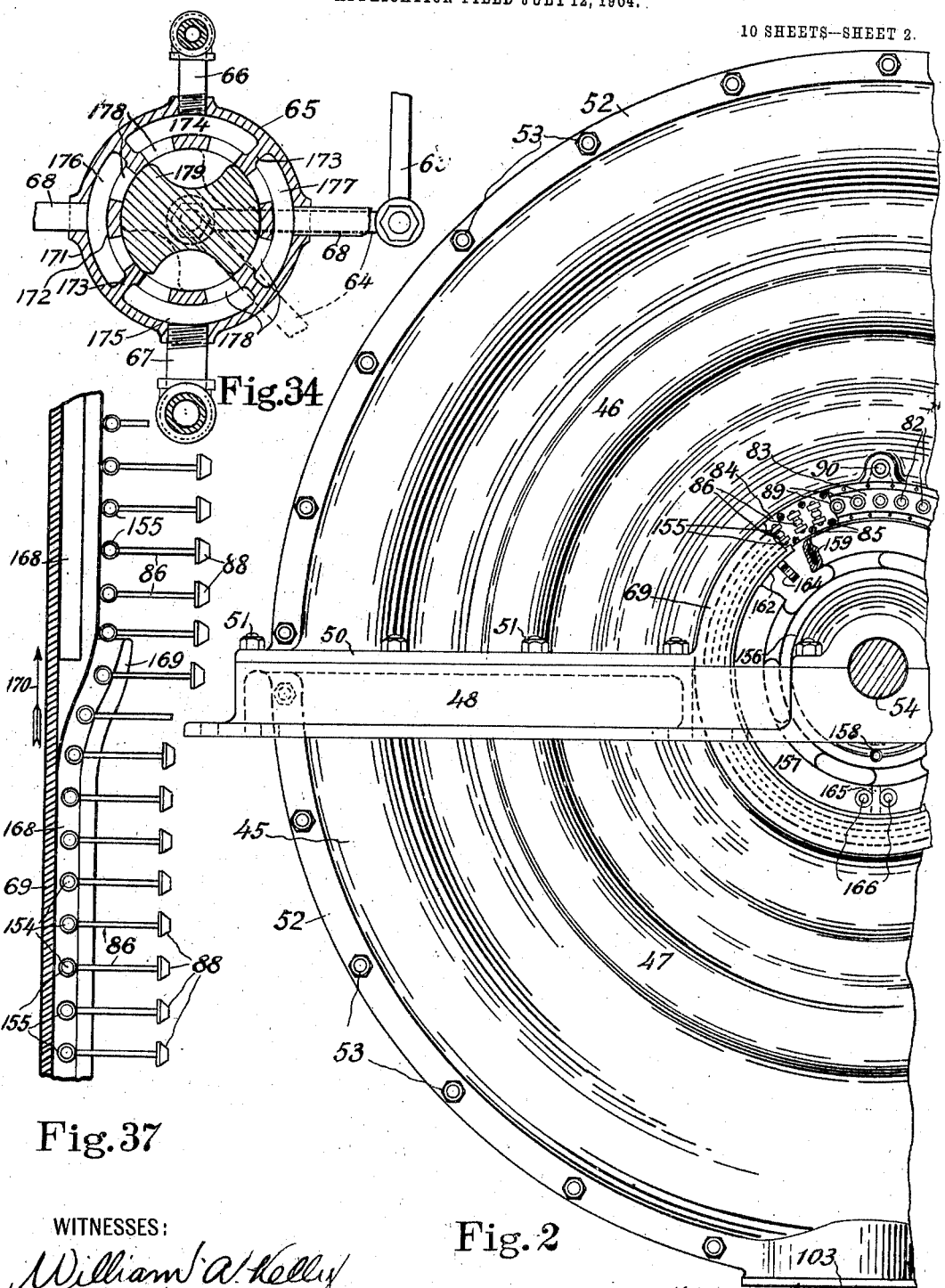
Figure 3:
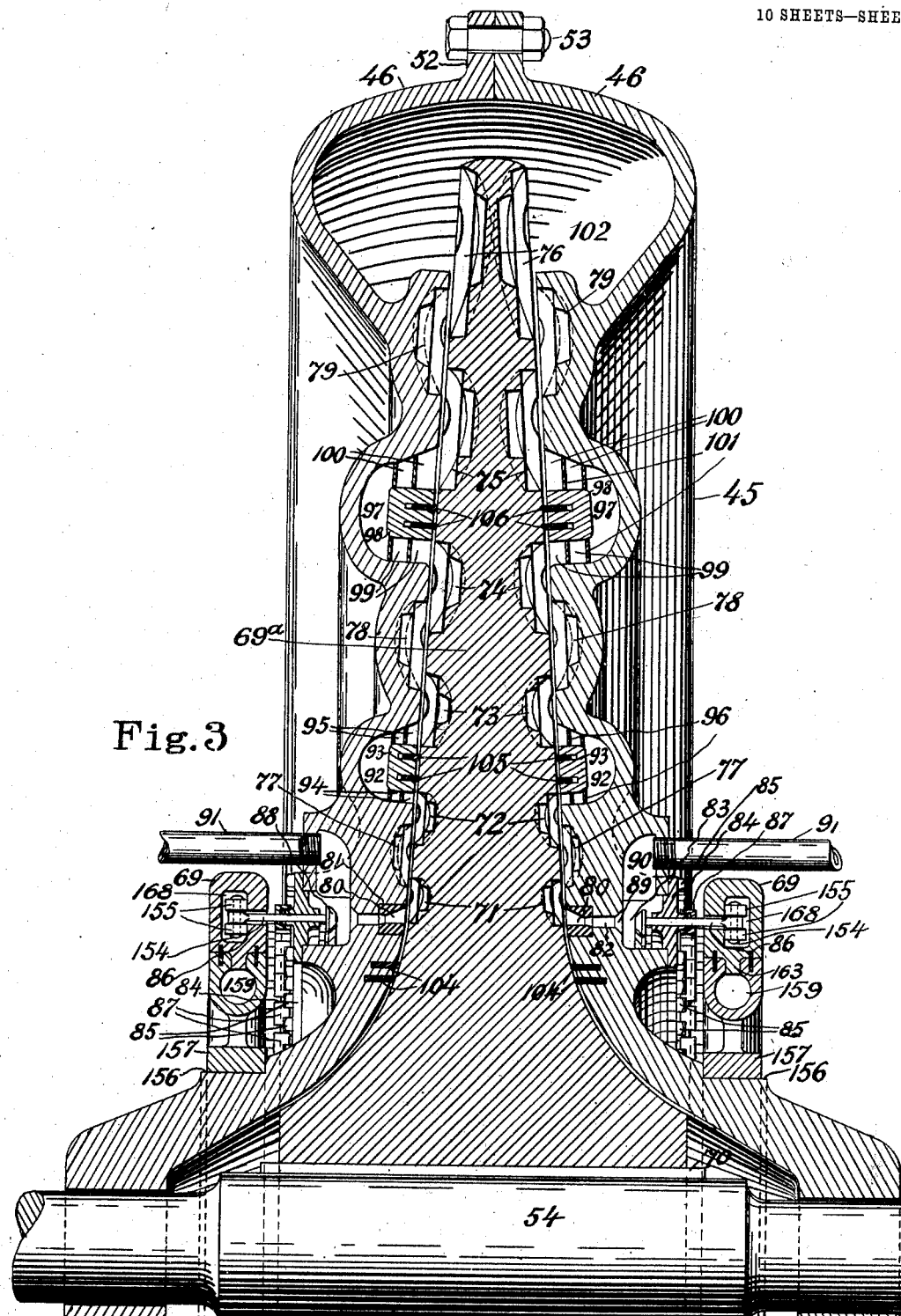
Figure 4:
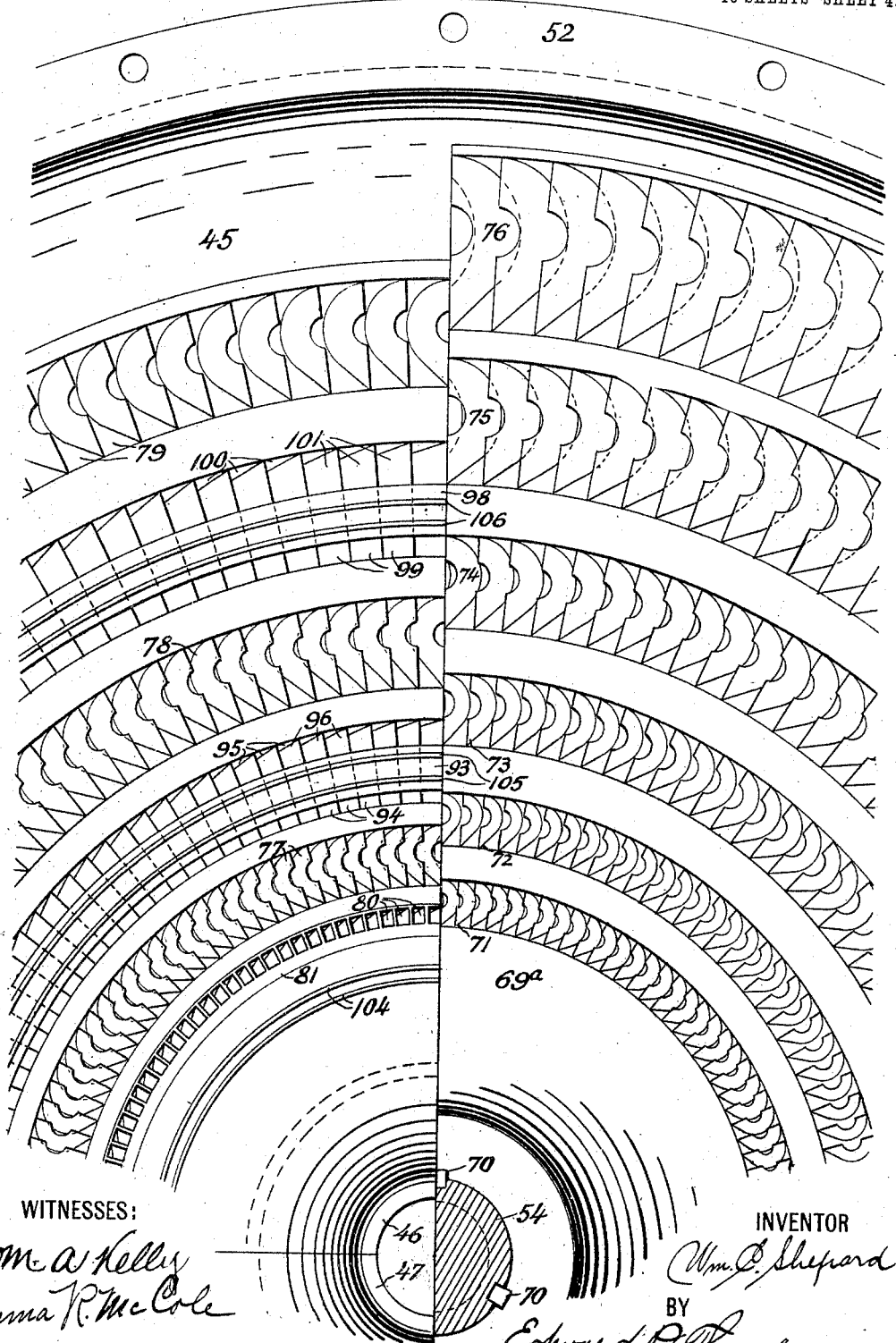
Figure 35:
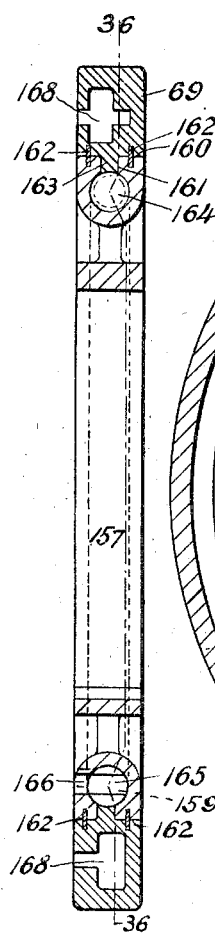
Figure 36:
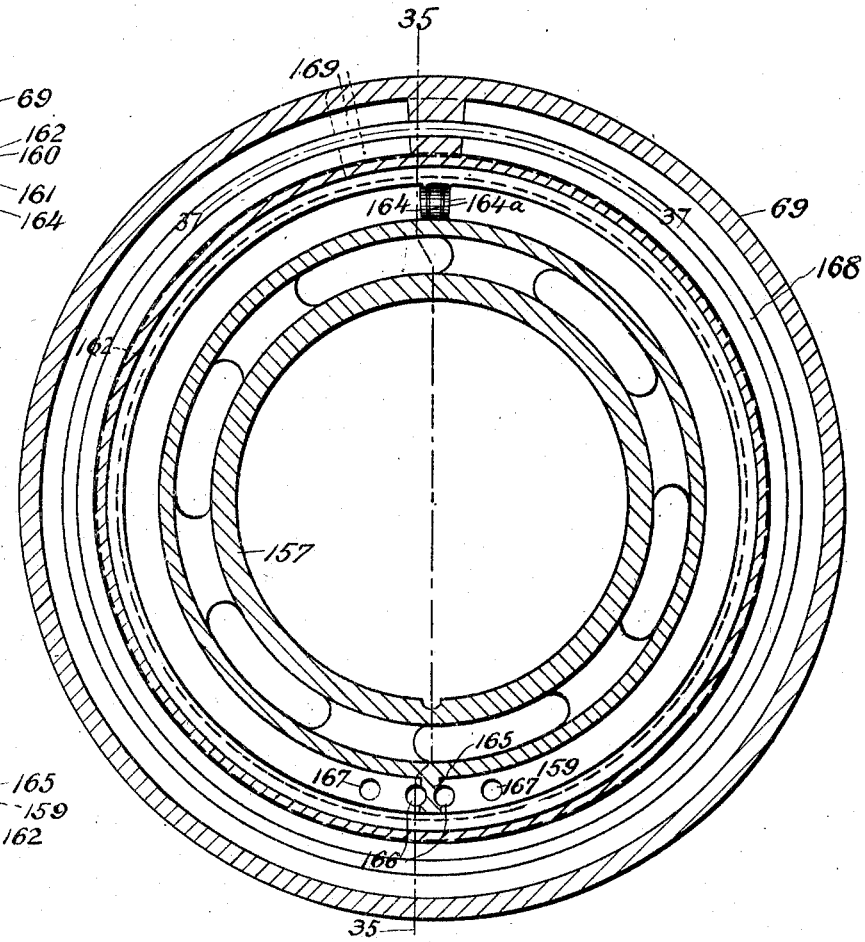
Figure 38:
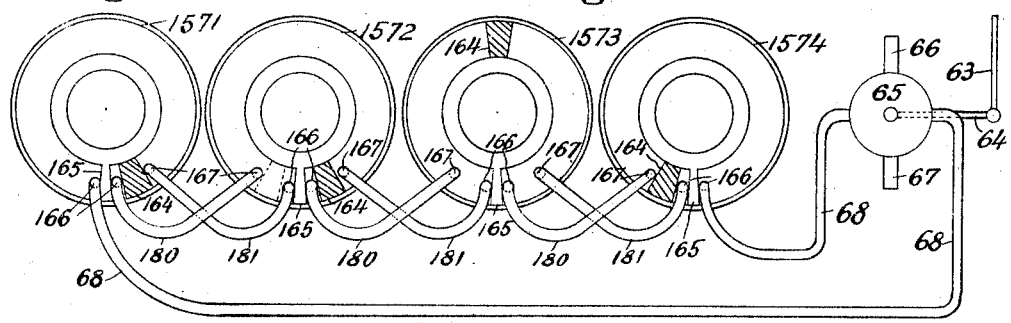
Figure 40:
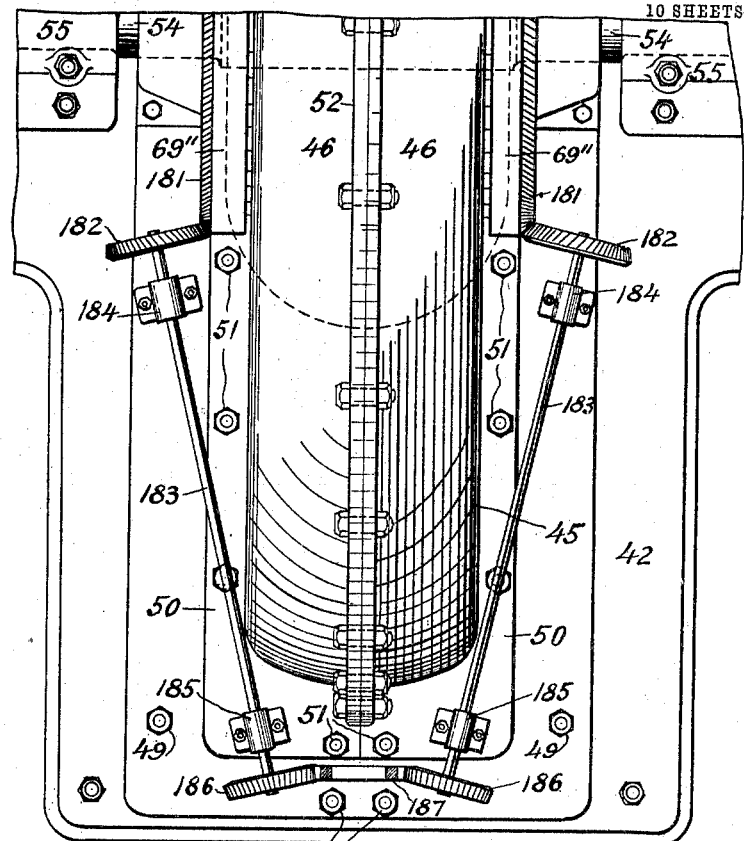
Figure 39:
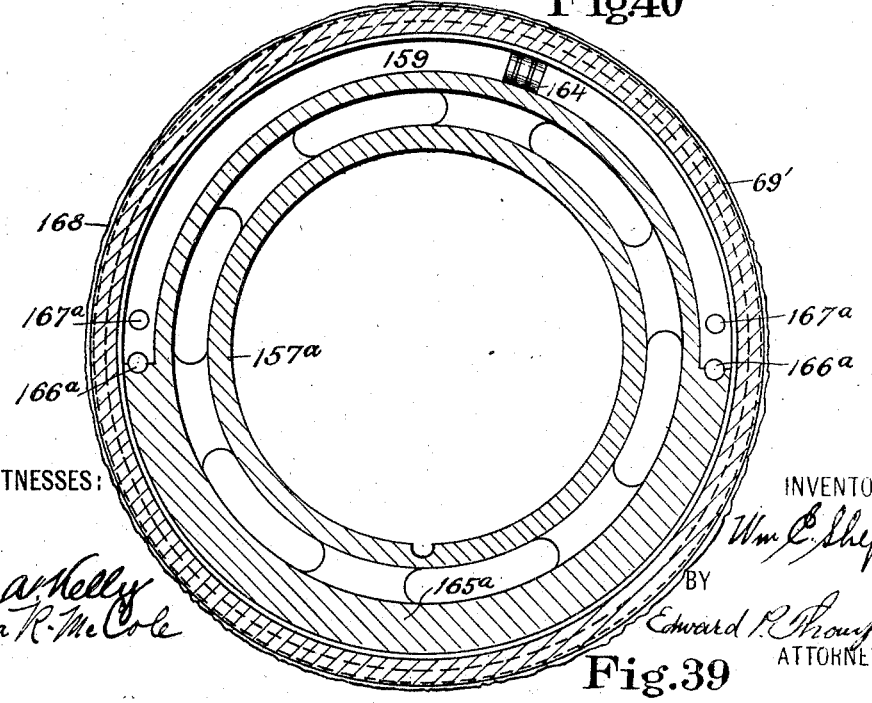

Figure 1 is a side elevation of the complete machine. Fig. 2 is a fragmentary side view of the turbine proper, being a section through the shaft at right angles to Fig. 1 and showing part of the regulating mechanism broken away. Fig. 3 is a vertical axial section through the wheel-casing, on an enlarged scale, showing only the upper portion thereof. Fig. 4 is a side elevation of a portion of the wheel and interior of the casing to show the construction of the buckets and guides. Fig. 5 is a somewhat diagrammatic view of a segment of a turbine-wheel to show the successive steps of constructing the buckets. Fig. 6 is a developed circumferential section on the line 6 of Fig. 5, showing the same series of steps and the tools employed to form the buckets. Fig. 7 is a radial section taken on the line 7 of Fig. 5. Figs. 8 and 9 are respectively a side and plan view of one of the blocks used in connection with the buckets shown in Figs. 5 and 6. Fig. 10 is a perspective view of one of the plates used in the same construction. Figs. 11, 12, and 13 are respectively a face view, a developed circumferential section on the line 12, and a transverse or radial section on the line 13 of a modified construction for the buckets. Figs. 14 and 15 are respectively a face view and a developed circumferential section on the line 15 of another modified construction of the buckets. Figs. 16 and 17 are respectively a side and plan view of one of the blocks used in this construction. Figs. 18 and 19 are respectively a face view and a developed circumferential section showing a variation of this construction. Figs. 20 and 21 are respectively an upper and under face view of one of the strips used in the construction of Figs. 18 and 19 to take the place of the blocks of Figs. 14 and 15. Figs. 22, 23, and 24 are respectively a face view, developed circumferential section on the line 23, and a transverse or radial section on the line 24, showing another modified construction of the buckets. Figs. 25 and 26 are respectively a side and plan view of one of the blocks used in the last-mentioned construction. Figs. 27, 28, and 29 are respectively a face view, a developed circumferential section on the line 28, and a transverse section on the line 29, showing a variation in the construction of Figs. 22, 23, and 24. Fig. 30 is a side view from the inner side and on an enlarged scale of the construction of a portion of one of the annular receiver-chambers and expansion-nozzles connected therewith, showing also a portion of the casing of the turbine broken away. Fig. 31 is a side view from the outer side—that is to say, looking in the direction of the arrow 31, Fig. 30; and Fig. 32, an inner side view or one looking in the direction of the arrow 32, Fig. 30, of the same construction, the latter figure showing a part of the casing in circumferential section. Fig. 33 is a transverse or radial section through the same construction and through the casing, taken on the line 33. Fig. 34 is a section transverse to the axis, taken through my improved four-way governor-valve to show the internal construction and operation thereof. Fig. 35 is a diametrical section on the line 35 of Fig. 36 of the regulating-ring for the admission-valves and of its operating mechanism. Fig. 36 is a section of the same construction perpendicular to the plane of Fig. 35 and on the line 36 thereof. Fig. 37 is a developed circumferential section on the line 37 of Fig. 36 to show the mode of operation of the valves by the regulating-ring. Fig. 38 is a diagrammatic view showing my arrangement of the governing mechanism for a compound turbine comprising a plurality of wheels on one shaft. Fig. 39 is a modified construction of the regulating-ring for the admission-valves wherein steam is admitted simultaneously on the opposite sides of the diameter of the wheels, whereby a side pressure upon the bearings is prevented. Fig. 40 is a plan view of a portion of a turbine, showing a modified construction of the regulating mechanism whereby the admission-valves on both sides of the wheel are operated simultaneously. Fig. 41 is a partly-diagrammatic view of the form assumed by the mechanism of Fig. 38 in this instance.

In the drawings and the following description the same reference character always refers to the same part.

Referring first to Figs. 1, 2, 3, and 4, 42 is a heavy base-plate which may be mounted on a foundation 43, provided with an opening 44, into which the casing of the turbine depends. On this base-plate 42 is mounted the wheel-casing 45, which is made in four semicircular portions 46 and 47, being divided centrally transverse to the axis and in the horizontal axial plane. The sections 47 are provided, as shown, with a set of flanges 48, which rest upon the base-plate 42 and are bolted thereto by holding-down bolts 49. The upper sections 46 of the casings are likewise provided with flanges 50, which are bolted to the flanges 48 by bolts 51, and each pair of sections 46 and 47 are bolted together by the marginal flanges 52 and bolts 53. The shaft of the turbine is shown at 54 mounted axially within the casing 45 and supported in pillow-blocks 55. As shown, the end of this shaft at the right of Fig. 1—that is to say, the end distant from that at which the driven machine is applied or from which power is taken—is provided with a small worm 56, which drives a worm-wheel 57, mounted on the governor-shaft 58, which may turn upon the usual spindle or otherwise, supported by the post 59, which is bolted to the base 42. At the upper end of this shaft is carried a centrifugal governor 60 of any preferred type, which has a grooved ring 61 inclosing a non-rotating collar 62, to which is connected a link 63, which is connected to the end of the valve-lever 64 belonging to the governor-valve 65, which is part of my improved construction hereinafter described. This valve has pipe connections 66 and 67, leading to a source of fluid-pressure and to a desirable outlet, respectively, and pipe connections 68, (only one of which is shown in Fig. 1,) which lead to the actuating-cylinder in the regulating-ring 69, which governs the opening and closing of the admission-nozzles for the steam to the turbines. It will be seen from Fig. 3 that the casing 45 of the wheel is arranged to surround the shaft 54 closely without being in actual contact therewith. Hence this point of junction contains no packing. The wheel and casing are otherwise packed to prevent the escape of steam, as will be described later on. The wheel (shown in section at 69ª, Fig. 3, and in elevation on the right of Fig. 4) is mounted on the shaft 54 and keyed thereto by keys 70 and is provided on both faces thereof with a plurality of circular series of buckets, (numbered 71, 72, 73, 74, 75, and 76.) The inner face of the casing 45, on the other hand, is likewise provided with an opposing series of stationary guide-buckets 77, 78, and 79, these being located, respectively, between the series 71 and 72 and 73 and 74 and 75 and 76 of the wheel. Within the series 77 and 78 the casing has on each interior side a circular series of expansion-nozzles 80, which are formed in rings of hard or otherwise suitable metal 81, set in proper grooves in a face of the casing, so as to be flush therewith, it being understood that these nozzles are obliquely directed in a circumferential direction, so as to cause the steam to issue against the inner side of the buckets 71 of the wheel. With these expansion-nozzles 80 communicate the tubular passage-ways 82, formed in the casing and communicating with the annular steam-chest 83 in the outer side of the casing, each steam-chest being closed by an annular plate 84, secured thereto by bolts 85. Through the plates 85 are formed passage-ways for valve-stems 86, each packed by a gland 87, carrying on its inner end a valve 88, adapted to fit the seat 89, formed on the end of the passage-way 82, so as to close said passage-way when the stem 86 is pushed in. There is also formed in the outer side of the casing and on each side thereof at one point therein (shown as the uppermost point of the valve-chest) an expansion or vestibule 90 for the steam-pipe 91, which enters the same and communicates steam to the steam-chest 83. (See Figs. 2 and 3.) Of course several of such entrances for steam may be provided around the steam-chest, if necessary. Intermediate between the second and third series 72 and 73 of wheel-buckets there is arranged in each face of the wheel-casing opposed thereto a ring of receiving-chambers 92, which is separated from the face of the casing by the annular piece 93, entrance passage-ways 94 on the lower side, and expansion-nozzles 95 on the upper side, as seen in Figs. 3 and 4, said passage-ways and nozzles being formed by a series of obliquely-set plates or partitions 96, to be described later on more particularly. The passage-ways 94, which are of uniform section, are opposite the upper or exhaust ends of the buckets 72, while the expansion-nozzles 95 on the other side of the ring 93 are opposite the entrance end of the bucket 73, into which they discharge. The partitions 96 are so disposed that the passage-ways 94 receive the steam in a backward oblique direction from the bucket 72, and the nozzles 95 discharge it in a forward oblique direction. In a similar manner between the fourth and fifth series 74 and 75 of wheel-buckets is arranged the receiving-chamber 97, separated from the face of the wheel by the annular member 98 and provided with passage-ways 99, expansion-nozzles 100, and oblique partition-plates 101, whereby the same cycle of events takes place in the next lower stage of expansion as in the case of the receiving-chamber 92. It will be understood that the construction of the two sides of the wheel and casing are identical, as shown.

The cycle of operations of the motive fluid will now be understood. The steam enters the oblique expansion-nozzles 80 through the passage-ways 82 when the valves 88 are opened, reaches its full velocity due to the reduction in pressure between the nozzle 80 and the chamber 92 in said nozzles, and impinges at this velocity upon the first series of buckets 71, being reversed in direction and thereby communicating motion to the wheel. As the buckets 71 move with a linear velocity only one-fourth that of the steam instead of one-half, as in a wheel having only one row of buckets, the steam leaving the buckets 71 is thrown back into the stationary guide-buckets 77 with a velocity one-half of its original velocity, and is thence projected forward again through the outer or exhaust ends of the guide-buckets 77 into the wheel-buckets 72, thus giving a further impulse to the wheel, and being reflected at zero or a slightly backward velocity into the passage-ways 94, through which it passes into the first receiver 92, thus completing the first stage of the expansion. The steam passes from the chamber 92 through the oblique expansion-nozzles 95 and again reaches a velocity equal to approximately four times that of the buckets 73, into which it is thrown, said velocity being due to its expansion from the pressure in the receiver 92 to that in the receiver 97, the parts being so designed that such last-named velocity is greater than the velocity of projection in the nozzles 80 in proportion to the radial distance of the respective nozzles from the axis of revolution of the wheel. From the nozzles 95 the steam successively passes into the buckets 73, is reflected into the guide-buckets 78, thence reflected into the buckets 74, and again reflected with approximately zero velocity into the passage-ways 99, whence it arrives in the second receiver 97. From this receiver the same cycle of events again follows, the steam being projected through the oblique nozzles 100 at a velocity proportionally greater than that from the nozzles 80 and 95 in the ratio of their radial distance from the axis and due to its expansion from the pressure of the receiver 97 to exhaust-pressure, and striking the buckets 75 is reflected into the buckets 79 and thence into the buckets 76, the outer ends of which it leaves at zero velocity, escaping into the annular exhaust-chamber 102, which is inclosed by the outer margin of the casing. The exhaust-chamber 102 has a flanged outlet 103 at the lowest point thereof, (see Figs. 1 and 2,) to which may be connected suitable pipes to the atmosphere or a condenser, as desired.

It will thus be seen that the expansion of the steam in the wheel shown in Figs. 1 to 4 takes place in three stages, separated from each other by the two receivers 92 and 97. The steam undergoing each of the stages of expansion is separated from the other stages and from the atmosphere by means of packing-rings 104, 105, and 106, set in recesses in the wheel-casing within the row of nozzles 80 and in the annular members 93 and 98, respectively, and either caused to press lightly against the wheel or fixed in very close juxtaposition thereto, the approved construction of these package-rings being hereinafter more precisely described. It will be understood, of course, that in the same manner the expansion of the steam may be divided into any desirable number of stages and in each stage may be caused to act upon the wheel any desirable number of times, thus reducing the resulting velocity of the wheel to any required extent. For example, the velocity of the wheel just described would be but one-sixth of that of an ordinary wheel, in which the whole expansion of the steam is taken up by a single series of buckets.

My improved turbine is susceptible of various mechanical constructions, and it is one of the objects of the present invention to form the buckets of the wheel and casing with the least amount of mechanical labor and greatest rigidity, combined with the fewest number of separate parts. To this end I have shown a simple manner of constructing the wheel in Figs. 5 to 10, inclusive, Sheets 5 and 6. Fig. 5 shows in face view and Fig. 6 in developed circumferential section the successive operations to which the wheel-blank is subjected to form the finished bucket. Starting on the right, at A is shown a portion of the uncut blank, in which are first cut a series of grooves 107 108 109 110, as shown at B, in any suitable manner—as, for instance, on a milling-machine or lathe. These grooves have a depth proportionate to the size and depth of the finished bucket and are cut all the way around the wheel before the next operation. The second operation consists in applying a face drill or cutter 111 obliquely to the bottom of the groove 110 and similar tools of smaller sizes to the other grooves 107, 108, and 109, the diameter of this tool being such as to give a semicircular form to the outer portion of the bucket and approximately equal to the width of the bottom of the groove in which it works. This tool 111, having hollowed out an oblique semicircular or crescent-shaped recess for the bucket when in the position shown in Fig. 6 and by the dotted circle 111ª, Fig. 5, is moved in an oblique direction parallel to the plane of the bottom of the bucket—that is to say, in the direction shown by the line 112, Fig. 5, so as to form the inner or entering end of each bucket tangential. This form of bucket forms an important feature of my invention, as does also the mode of producing the same. This operation with the tool 111 is continued with each of the grooves all the way around the wheel, forming the bottoms of the buckets in a series of steps 113, 114, 115, and 116. The third operation consists of applying a thin circular saw-blade 117 obliquely in the manner and position shown in Fig. 6, so as to cut deep slots or recesses on the upper sides of each of the steps, and the saw is caused to cut deep enough to carry the slots below the bottom of the buckets and is then moved radially and at a depth proportional to its distance from the axis of the wheel toward the axis. In this manner the longitudinal saw-cuts 118 are formed. The fourth operation consists in fixing thin steel plates 119 in these saw-cuts. One of these plates is shown in perspective in Fig. 10, and it will be understood that each plate traverses all of the several series of buckets and is cut off obliquely on its upper edge 120, so as to lie flush with the surface of the wheel and to cut the steam sharply as it enters the bucket. These plates are held firmly in place by slightly upsetting or calking the edge of the metal of the disk at the ends of the plate and at points intermediate between the rows of buckets. The wheel may, if desired, be regarded as complete when thus formed; but it is generally thought proper to subject it to a fifth operation, comprising the placing near the center of each bucket of a small metal block 121. (Shown in detail in Figs. 8 and 9.) These blocks have parallel faces 122 and 123, fitting between the successive plates 119, and oblique faces 124, adapted to lie flush with the surface of the wheel-disk, and their rear or inner ends are rounded semicircularly, as shown at 125, being in a general way concentric with the circumferential outline of the buckets; but they are preferably set slightly eccentric toward the inner or entrance side of the buckets, so as to give the steam a slight expansion in passing through the buckets, this being a matter of customary practice and forming no part of my invention. Each block 121 is provided with four countersunk rivet-holes 126, through which and similar holes in the plates 119 pass rivets 127. These serve not only to hold the blocks 121 in place, but also to make a rigid whole of the series of buckets. It will be seen that the buckets so formed have a slightly enlarged or flaring inner or entrance end and preferably a slightly-increasing section from this end to the exhaust end.

In Figs. 11, 12, and 13 I have shown another way of forming the buckets, this way involving very little machine-work, and therefore being less costly than the preceding. 69$^b$ here represents the wheel-disk or body of the wheel, formed ordinarily of cast steel or iron and having machined at various points on its face concentric grooves of rectangular shouldered outline, as shown at 128, Fig. 13. In these grooves are fitted rings or segments of rings 129, of cast metal, which have, as shown on their outer face, trough-shaped grooves 130. These grooves are fitted with a series of oblique plates 131, which may be stamped out of sheet metal and cast into segments 129 *in situ*. The buckets are thus formed merely by setting the plates 131 in the segments or rings 129, being held in place by screws 132 at intervals along their periphery, screwed into the wheel-body 69$^b$.

In Figs. 14 and 15 is shown still another mode of forming the buckets, which in some respects is simpler than either of the preceding, the buckets being here machined out of the wheel-body 69$^c$, as by a milling-cutter or like revolving tool, set in a plane oblique to the wheel and cutting recesses 133 for the buckets directly, the partitions between the buckets being formed by the transverse webs 134, of metal, left between the successive cuts. It will be seen from Fig. 14 that the inner or entrance end of each bucket is provided with a tangential portion 135 in the same manner as already described for the buckets in Fig. 5. Near the center of each bucket is set a block 136, having a semicircular rear edge 137 and an oblique face 138 flush with the surface of the wheel, each block being provided with a screw-hole 139, recessed to receive the head of a screw 140, which passes through said hole and is secured in the body 69$^c$ of the wheel, thus holding the blocks 136, as well as the webs 134, rigidly in place. A variation of this mode of forming the buckets is shown in Figs. 18 and 19, the wheel-body being shown at 69$^d$ and having formed in it recesses 133, as above, leaving webs 134$^a$. These latter have central semicircular gouges 143 cut out to receive the shoulders 141 of a series of rings or segments of rings 142, Figs. 20 and 21, which take the place of the blocks 136 and are, in fact, equivalent to a series of these blocks fused together. In this case it is only necessary to have one screw 140 to every three or four buckets.

In some cases it will be desirable for the sake of simplicity to omit the segments 142, completely leaving open buckets with semicircular gouges, as in the case of the buckets of the wheel shown in Figs. 3 and 4.

Still another method of forming the buckets is shown in Figs. 22, 23, and 24, which is similar in some respects to that of Fig. 11 in having the plates 144 made of separate pieces of sheet metal cast into a ring or annular segment 129$^a$, which is secured in the shouldered groove 128$^a$ in the wheel-body 69$^b$ and held in place by screws 132$^a$ at intervals on the periphery, this mode, however, being similar to that of Figs. 14 and 18 in having the rear walls of the buckets cylindrical and at right angles to the plane of the plates 144 instead of oblique, as in Fig. 12, and also in having blocks 136$^a$ secured in place by screws 140$^a$; but in this instance the screws 140$^a$ enter the segments 129$^a$ from the back, so that their heads are hidden and cannot become rusty or stopped up with dirt nor can the screws become loose or come out, as they rest against the back of the groove 128$^a$.

Figs. 27, 28, and 29 show a modification of the last form, embodying in place of the blocks 136$^a$, which are similar to the blocks 136, continuous strips 142$^a$ similar to the strips 142, the plates 144$^a$ having semicircular gouges 140$^a$ to receive the shoulders of the strips. In other respects the form of buckets shown in Figs. 27 to 29 is the same as in Figs. 22 to 24.

In Figs. 30 to 33, Sheet 8, are shown the details of the annular receiving-chambers 92 and the parts connected therewith. At 45 in each figure is shown a portion of the casing, which has at this point a semicircular recess, as shown. In the center of the open end of the recess is arranged the ring member 93 of rectangular section, this ring member having cast into it a series of plates 96, which plates are on the side adjacent to the casing set in axial planes and of semicircular outline to fit the inner wall of the chamber 92; but on the lateral sides of the ring member 93 they are obliquely and forwardly directed. At the entering side of the ring 93, Fig. 32, the plates 96 are of uniform thickness, merely sharpened at the ends 145, so as to form the passage-ways 94 of uniform cross-section. At the opposite or exit side of the ring 93, Fig. 31, the plates 96 are tapered so as to form the flaring expansion-nozzles 95. These rings 93, with the plates, are secured as a whole by means of cap-screws 146, projecting through the casing from the outside, whereby the whole may be drawn tightly into place. In addition there are formed in the outer face of the block 93 adjacent to the wheel concentric annular grooves 147, in which are seated the packing-strips 105, which may be of any preferable material, such as copper, Babbitt metal, composition, carbon, or the like. These strips ordinarily are not pressed resiliently against the wheel, although they may be, if found desirable; but they are held in close juxtaposition thereto in the following manner. At intervals along each strip are formed two screw-holes close together, in which are set a headless screw 149, which is engaged with a thread in the hole, and a headed screw 150, which turns freely in its hole, but engages the thread of the recess 151, formed in the packing-strip. By means of the screw 149 the strip may be pressed toward the wheel, while by means of the screw 150 the strip is drawn away from the wheel, the two screws thus acting in opposition, whereby the strip is locked in any desirable position. By means of the screw-plug 152, threaded into a hole in the back of the chamber 92, a screw-driver may be inserted from outside the casing to adjust the screws 149 and 150, and the packing-strips thus set so as to touch the wheel lightly. When the wheel is set in operation, in a short time these strips become worn down, so that they are just out of contact with the wheel, whereby they produce no unnecessary friction, while at the same time they are sufficiently close to the wheel to prevent material leakage of steam. As a further prevention against leakage the wheel-body 69 may be provided with concentric grooves 153, which receive the ends of the packing-strips 105.

I will now describe the means of regulating the flow of steam to the wheel, or, in other words, automatically opening and closing the puppet-valves 88.

As shown in Figs. 2, 3, and 37, the valve-stems 86 are provided on the end opposite from the valve 88 with transverse radially-set axles 154, at the ends of which are mounted rollers 155. The casing 45 is provided with a cylindrical or circular seat 156, on which is fitted an annular or wheel-shaped member 157, which is keyed thereto by a dowel 158. This member is shown more fully in Figs. 35 and 36. In the ring portion thereof is formed an annular fluid-pressure cylinder 159, which communicates with the cylindrical outer margin 160 by an encircling groove 161. On the said cylindrical margin 160 is rotatably mounted the regulating-ring 69, which has an inwardly-projecting circular flange or rib 163, fitting and sliding in the groove 161. The joint between the member 157 and the ring 160 is packed by rings of packing material 162, let into grooves in the abutting surfaces. The ring 160 carries at one point thereof, projecting inwardly from the rib 163 and filling the chamber of the cylinder 159, radial piston 164, which may be provided with packing-rings 164$^a$ and is adapted to move in either direction around said annular cylinder, the cylinder itself having at its lowermost or any other suitable point a partition 165 across it, and on either side of the partition 165 are a pair of orifices 166 and a second pair 167, set at a distance from the partition 165 equal to the width of the piston 164, so that when the piston 164 is close against the partition 165 there is a communication between the two apertures 167 around the cylinder, where as when the piston 164 occupies any intermediate position there is no communication between the two ends of the cylinder. The mode of operation of this apparatus will be described presently. The regulating-ring 162 has provided in it, as shown, a T-shaped annular recess 168, which opens on the face adjacent to the valve-chest. This T-shaped groove may extend all around the ring except at one point thereof, (shown at the uppermost side of the ring in Figs. 35 and 36 and in developed circumferential section in Fig. 37,) which is the entering-point for the rollers 155, mounted on the valve-stems. At this point the ring may be provided with tongue-shaped guides 169, in which the T-shaped groove ends obliquely, communicating with the outside of the ring, while the other end of the groove ends at this point. It will be evident from its construction that when the ring is moved in the direction of the arrow 170, Fig. 37, the valves will be drawn back so as to admit steam to the nozzles 80; while when the ring is turned in the opposite direction they will be pushed forward so as to close the ports 82 and shut off steam successively from the nozzles. Thus it will be seen that there is at no time any throttling or wire-drawing of the steam, and each nozzle works independently and at its fullest efficiency under all circumstances. The radial piston 164 is operated by the agency of the governor 60, already described, through the medium of the four-way valve 65, which is shown in section, Fig. 34, this valve serving to admit alternately at opposite ends of the annular cylinder 159 a fluid under pressure and simultaneously to exhaust it from the other end, thus driving the piston 164 in either direction as circumstances may require. Such pressure fluid may be either steam, compressed air, water, oil, or any other medium, as may be most convenient, and it is admitted to the valve 65 through the pipe 66, as already described. The valve 61 is, as shown, composed of two concentric cylindrical walls 171 172, closed by a head at each end, and the space between the walls is divided by radial partitions 173 into four equal segmental chambers 174 175 176 177, the first two of which communicate, respectively, with the pressure-pipe 66 and the exhaust-pipe 67 and the others with the pipes 68, which are connected (in case of only one wheel being used) to the apertures 166, adjacent to the partition 165 in the annular cylinder 159, the other two apertures 167 being plugged in this instance. Each of the chambers 174 175 176 177 has two ports 178, extending through the inner wall 172 at opposite ends of such chamber and communicating with the inner cylindrical chamber of the valve, in which oscillates the valve-plug 179, which is of such form as to extend over and close two pairs of opposite orifices 178, while the other two pairs of orifices 178 are left in communication with each other. This valve-plug 179 is operated by the lever 64, and it will be seen that in the position shown, which is the normal operating position at full speed, all four of the passage-ways of the valve are closed completely. Suppose, however, the load to diminish, causing a slight increase in the speed and so causing the collar 62 of the governor to rise. The lever 64 will be raised and the pressure-chamber 174 placed in communication with the chamber 176, this in turn admitting the pressure at one end of the cylinders 159 and exhausting it from the other, whereby the piston 164 is caused to move around the cylinder in such direction as to close one or more of the ports 82 by pushing in the valve-stems 86. Should the load increase, on the other hand, the speed will diminish, the governor drop, and the plug of the four-way valve 65 turn in the opposite direction or into the position shown in dotted lines in Fig. 34, thus admitting pressure into the right-hand pipe 68 and exhausting the left-hand pipe 68 and causing the piston 164 to move in the opposite direction and to open one or more of the valves 88. It will be seen, therefore, that this governor is completely astatic because the regulating-ring 162 is moved to open and close the valves at all times except when the governor is exactly at the right speed and the valve occupies a position in which both the pressure-pipe 66 and the exhaust-pipe 67 are shut off from the pipes 68.

In Fig. 39 I have shown a modified and generally preferable form of the regulating ring and piston of Figs. 35 and 36. For the sake of simplicity I have originally described the ring 69 as having but one T-groove 168 continuous all the way round except at one point. In this case it is obvious that in order to reverse the position of all the valves 88 the ring 69 must make a complete revolution. In practice the T-groove 168 may be divided into two, three, four, or more distinct portions, each provided with an oblique portion and tongue 169, as shown in Fig. 37, these being at equal distances around the ring, whereby two or more of the valves 88 are opened and closed simultaneously at symmetrical points around the wheel, thus avoiding any unbalancing of pressure. Fig. 39 shows this modification adapted to the simultaneous operation of the two valves 88, at opposite ends of a diameter, the ring 69' being accordingly provided with two of the oblique tongues 169. (This ring is partly broken away in the figure.) The ring member 157$^a$, containing the annular cylinder 159$^a$, becomes here modified so that the partition 165 of Fig. 36 becomes a solid filling 165$^a$ of nearly one hundred and eighty degrees, and the apertures 166$^a$ 167$^a$ are correspondingly placed with respect to the ends of this solid portion. The remaining parts are identical with the apparatus already described, and it will be seen that the piston 164 requires to make only one-half a revolution in order to completely open or close all the valves.

I will now describe the governing devices whereby several wheels on the same shaft are operated in interconnection with each other by the same governor. This constitutes a very important element of my invention, as it enables such a series of wheels to be operated at full load at equal efficiency to and at less than full load at much greater efficiency than a single large wheel of the same total capacity, besides greatly simplifying the construction of the different sizes required for various uses. This arrangement is illustrated diagrammatically in Fig. 38, in which 1571, 1572, 1573, and 1574 represent respective regulating-cylinders 157 of each of the series of such wheels mounted on a single shaft, while the valve 65, with its pipes 66, 67, and 68, are also shown, the latter pipes being connected up, respectively, to one side of the regulating-cylinders 1571 at one end and to the opposite side of the regulating-cylinder 1574 at the other end through the apertures 166. The several regulating-cylinders are interconnected by pipes 180 181 in the following manner, to wit: each pipe 180 is connected to the right-hand aperture 166 of one ring and to the left-hand aperture 167 of the next adjacent ring, and, conversely, the pipes 181 are each connected to the left-hand aperture 166 of one ring and the right-hand aperture 167 of the next adjacent ring. The end apertures 167 on the sides to which the pipes 68 are connected are plugged. With this series of connections the operation will be seen to be as follows: Supposing the load to increase, the valve-lever 64 will be depressed and, as already explained, steam will be admitted to the right-hand pipe 68, passing to the left-hand end regulating-ring 1571 and the pressure entering the same behind the piston 164, which may at this time be supposed to be on the left-hand side of the partition 165. At the same time the left-hand pipe 68 will be opened to the exhaust, which communicates the lower pressure to the right-hand side of the partition 165 in the right-hand end cylinder 1574. The piston 164 of this cylinder will likewise be found on the left-hand side of the partition 165, as will all the other pistons, if the steam is at first completely shut off from the turbine, and hence the low pressure is communicated through the successive pipes 180 to the right-hand end of the cylinder 1571, so that the piston 164 of this cylinder will be driven around to the right, and this will continue until the piston 164 has reached its extreme position on the right, as shown in the figure, whereupon the right-hand aperture 167 of this cylinder will be uncovered, and (supposing the speed to be still below normal,) the high pressure will therefore pass through the pipe 181 into the regulating-cylinder 1572 of the next wheel, thus driving the piston of this cylinder likewise around to the right until it rests at extreme right-hand position, when the high pressure will be admitted in like manner through the next pipe 181, and the piston of the third cylinder 1573 will be likewise actuated, and we will suppose that at a certain intermediate position of the piston in this cylinder the load becomes unbalanced and the speed normal, whereupon the piston of the cylinder 1573 will be driven in one direction or the other again, according to whether the lever 64 of the valve 65 is raised or lowered. It will be observed that as the load increases the wheels come successively into action, each wheel being completely turned on before the next wheel begins to be turned on. In this manner, however, many wheels may be mounted on the same axis only one is run at part load, and this one serves to adjust the variation in the total load, and all the wheels on one side of this one are running at full load, and all those on the other side are running empty and in full vacuum of the condenser.

In Fig. 1 the two rings 69 on opposite sides of the wheel are shown as acting independently of each other, the serings, or, rather, the cylinder operating them, being connected up in parallel to the pipe 68. In practice I prefer, however, to provide means for causing the two rings to move absolutely simultaneously, so that no end thrust is caused by more valves being opened on one side of the wheel than on the other. Such means are shown in Fig. 40, comprising gearing joining the two rings together around the wheel-casing. The regulating-rings 69″ are shown as having gear-teeth 181, formed around their peripheries, these gear-teeth meshing with a pair of gear-wheels 182, mounted on shafts 183, turning in bearings 184 and 185, secured to the wheel-casing. These shafts have at their opposite ends gear-wheels 186, which mesh together on opposite sides of the double rack 187, thus mechanically connecting the rings 69″. The annular cylinders 159 may be in this case replaced by mechanism acting directly on the rack 187 to raise and lower it, and I have shown the form which such modified mechanism assumes when several wheels are connected in series, as already described diagrammatically in Fig. 41. As shown, the racks 187 are mounted on the ends of the piston-rods 188, which are actuated by pistons 189, reciprocating in cylinders 190, the two pipes 68 being in this case connected, respectively, to the lower end of the cylinder 190 at one end and the upper end of the cylinder 190 at the other end of the series. The intermediate cylinders are connected to each other and to the end cylinders by pipes 191 and 192, the former connecting the upper end of one cylinder to a point near the lower end of the next and distant from said lower end by a space equal to the thickness of the piston 189 therein, and the pipe 192 connects the lower end of said last-named cylinder with a point near the upper end of the first and distant therefrom likewise by a space equal to the thickness of the piston 189 therein. It will be readily seen on examination that this arrangement works substantially in the same manner as that already described and shown in Fig. 38, the difference being merely the pistons are set in a straight instead of an annular cylinder. I do not herein specifically claim this connection of my regulating apparatus, this being merely one form or embodiment of the general principle thereof which I do claim.

It may be observed that with any individual wheel which is working with only a part of the steam-ports open there will be a certain fanning out or spreading of the steam at the end buckets—that is to say, the buckets in radial line with the end nozzles of the row which are turned on. This will cause a slight loss in efficiency; but as this will be the case with only four buckets on the one wheel performing the regulation at any one time the loss of efficiency thus caused will be very slight. With all the other nozzles from which steam issues the path of the steam is substantially radial from the nozzles 80 to the exhaust-chamber 102.

While I have described above several embodiments and forms of my invention, I do not wish to limit myself to these specific forms, as it will be readily understood that they are merely illustrations of the general principles involved, which are covered by the following claims.

Having thus described my invention, what I claim, and desire to secure by Letters Patent, is—

1. An elastic-fluid turbine comprising a rotating disk and fixed envelop having reëntrant inclosed guiding-passages so constructed on each that the coördination of the fixed and moving inclosed guiding-passages, present a free, direct and unobstructed passage for the fluid to exhaust in a continuous and radial sinusoidal movement.

2. An elastic-fluid turbine comprising a rotating disk, having concentric rows of radially-positioned inclosed reëntrant guiding-passages on one side thereof adapted to receive an elastic motive fluid at one end and reflect it in a backward direction at the other end as regards each of said passages; said ends being parallel with each other and located along the same radial line.

3. An elastic-fluid turbine comprising a rotating disk and fixed envelop having reëntrant inclosed guiding-passages successively longer and longer from the admission-passages, and so constructed in each that the coördination of the fixed and moving guiding-passages present an open, continuous, and unobstructed passage, of continuously-increasing cross-section from the entrance of the passage to the exhaust.

4. An elastic-fluid turbine comprising a rotating disk having concentric rows of reëntrant inclosed guiding passage-ways on one side thereof, means for continuously delivering to said passage-ways at their ends nearest to the axis an elastic motive fluid of a predetermined and uniform density whereby they are caused to exhaust said fluid in tangential directions with respect to the direction of rotation of the disk at their ends farthest from the axis, the two ends of each passage-way being disposed on the same radial line relatively to the axis of said disk.

5. An elastic-fluid turbine comprising a rotating disk having reëntrant inclosed guiding-passages in concentric rows on one side thereof adapted to receive an elastic motive fluid in a forward tangential direction at their ends nearest the axis, reflecting it in a backward tangential direction at their ends farthest from the axis, in combination with ports in concentric rows communicating between any exhaust end of any of said passages and the next succeeding admission end, the ends of the ports and passages being grouped in radial lines.

6. An elastic-fluid turbine comprising a rotating disk having two or more concentric circular series of curved, radially-positioned guiding-surfaces therein, a series of nozzles adapted to project the motive fluid against each of said series of guiding-surfaces in succession, and means for taking up steam-exhaust from the first series and directing it into the nozzles of the second series.

7. An elastic-fluid turbine comprising a rotating disk having concentric rows of reëntrant inclosed guiding-passages on one side thereof, whose openings are radially disposed and adapted to receive an elastic motive fluid and reflect it in a backward direction, in combination with one or more expansion-nozzles adapted to project a stream of elastic motive fluid into said passages in a partly or wholly tangential direction.

8. An elastic-fluid turbine comprising a discoid rotating member and an envelop therefor, each having reëntrant inclosed guiding-passages so constructed that the coördination of these guiding-passages shall present an open and continuous passage of gradually and continuously increasing section and length from the entering end to the exhaust end.

9. An elastic-fluid turbine comprising a rotating member, a stationary member juxtaposed thereto, a plurality of circular series of reëntrant inclosed guiding-passages on the adjacent sides of said two members, each adapted to receive the motive fluid from the other and reflect it back, and means for directing one or more streams of such fluid into the innermost series of rotating passages whereby said fluid is caused to pass radially outward, acting a succession of times upon said rotating member to impel the same, each rotating reëntrant guiding-passage consisting of a recess in the face of said rotating member with plane sides and a curved bottom and top.

10. An elastic-fluid turbine comprising a rotating member having circular series of guiding-surfaces upon one face thereof adapted to receive and reflect a current of elastic motive fluid, a stationary member juxtaposed to said rotating member and having a receiving-chamber formed therein opposite to and between two of said circular series, said chamber having passage-ways arranged to receive the fluid from one series and project it against the next, and means for projecting a current of said fluid against the first series.

11. An elastic-fluid turbine comprising a rotating member having circular series of guiding-surfaces upon one face thereof adapted to receive and reflect a current of elastic motive fluid, a stationary member juxtaposed to said rotating member and having a receiving-chamber formed therein opposite to and between two of said circular series, said chamber having passage-ways arranged to receive the fluid from one series and project it against the next, means for separating said two series from each other to prevent the fluid from passing from one to the other except through said receiving-chamber thus causing different pressures to prevail in the respective series and enabling the expansion to take place by successive steps or stages.

12. A multiple-stage expansion-turbine comprising a discoid rotating member having circular series of guiding-surfaces upon one face thereof adapted to receive and reflect a current of elastic motive fluid, one or more expansion-nozzles arranged to direct a current of said fluid against the first of said series, a receiving-chamber opposite and between two of said series, passage-ways adapted to receive said fluid from one of said series and conduct it into said chamber, one or more expansion-nozzles leading from said chamber and directing said fluid against the other series, and packing means isolating the steam leaving the first nozzle or nozzles from the others, whereby the expansion takes place in successive stages.

13. An elastic-fluid impulse-turbine comprising a rotating discoid member having a plurality of sets of circularly-arranged guiding-surfaces adapted to receive the motive fluid in a partially-tangential direction and reflect the same, absorbing a portion of its kinetic energy, stationary members juxtaposed to the respective sides and each having guiding-surfaces opposite to and between those on the rotating member and adapted to receive the steam from one set and deliver it to another set of said surfaces, one or more receiving-chambers opposite to and between another pair or pairs of said rotating sets of guide-surfaces, passage-ways adapted to receive said fluid from one set and deliver it to said receiving-chamber and expansion-nozzles adapted to project the steam from said receiving-chamber against the next set of said rotating guide-surfaces, expansion-nozzles adapted to deliver the fluid at initial pressure against the first set of said rotating guide-surfaces, and means for confining the fluid undergoing each stage of expansion.

14. An elastic-fluid turbine comprising a discoid rotating member having a plurality of circular series of crescent-shaped inclosed expanding passage-ways on one side thereof, each arranged to receive the motive fluid in a partially-tangential direction at the inner end and reflect it in a partially-tangential direction at the outer end, whereby said fluid has a radially-outward motion, and a circular series of impelling-nozzles on the casing adjacent and opposite to said rotating passage-ways and adapted to direct said fluid into the latter.

15. An elastic-fluid turbine comprising a discoid rotating member having a plurality of circular series of crescent-shaped hollows forming buckets on one side thereof, each arranged to receive the motive fluid in a partially-tangential direction at the inner end and reflect it in a partially-tangential direction at the outer end, whereby said fluid has a radially-outward motion, a circular series of tangentially axially positioned impelling-nozzles adjacent and opposite to said rotating buckets and adapted to direct said fluid against the latter, and a plurality of valves adapted to close independently the respective nozzles.

16. An elastic-fluid turbine comprising a discoid rotating member having a plurality of circular series of laterally-reëntrant buckets extending into one side thereof, each arranged to receive a motive fluid with respect to said buckets tangentially at the inner end which is at a certain distance from the center of said member, and to reflect it oppositely and parallel to the tangential direction of admission at the outer end of said bucket at a distance from the center greater than the inner end above mentioned, a circular series of impelling-nozzles respectively opposite to said rotating buckets and adapted to direct said fluid against the latter, a plurality of valves adapted to close independently the said nozzles respectively, and means for successively opening and closing said valves in accordance with variations of the load.

17. An elastic-fluid impulse-turbine comprising a rotating discoid member having several concentric series of crescent-shaped inclosed expanding passage-ways formed in the face thereof, the passage-ways of each series being adapted to receive the motive fluid in a tangential direction at their inner ends and reflect and discharge it backwardly at their outer ends, one or more stationary sets of similar inclosed expanding passage-ways in the casing arranged opposite and adjacent to and between the successive pairs of concentric series of rotating passage-ways and adapted to receive the fluid from one set and reflect and discharge it into the next set, the passage-ways of the several series being arranged in radial ranks, and means for projecting a current of said fluid into the passage-ways of the innermost series.

18. An elastic-fluid impulse-turbine comprising a rotating discoid member having several concentric series of buckets formed in the face thereof, the buckets of each series being adapted to receive the motive fluid in a partially-tangential direction at their inner ends and reflect and discharge it backwardly at their outer ends, one or more stationary sets of buckets arranged opposite and adjacent to and between the successive pairs of concentric series of rotating buckets and adapted to receive the fluid from one set and reflect and discharge it into the next set, and means for projecting a current of said fluid against the buckets of the innermost set, in conjunction with one or more annular receiving-chambers taking the place of some of said stationary sets of buckets and having passage-ways receiving the fluid from one set of rotating buckets and expansion-nozzles discharging it against the next outer set, and packing-rings interposed between said passage-ways and nozzles and isolating the several stages of expansion of said fluid.

19. In an elastic-fluid turbine, a disk-shaped wheel having buckets formed in its side, each comprising a segmental obliquely-disposed recess substantially semicircular in outline but having an oblique straight tangential portion at one end thereof.

20. In an elastic-fluid turbine, a disk-shaped wheel having buckets formed in its side, each comprising a segmental obliquely-disposed recess substantially semicircular in outline but having an oblique straight tangential portion at the entering end thereof.

21. In an elastic-fluid turbine, a disk-shaped wheel having buckets comprising segmental obliquely and radially disposed recesses formed in it, and a semicircular block arranged near the center of each said recess so as to close the central part thereof.

22. In an elastic-fluid turbine, a disk-shaped rotating member having a plurality of circularly-arranged buckets therein, said buckets being formed of oblique radially-set plates embedded in said member, the latter having an annular recess traversed by said plates, and semicircular oblique-faced blocks between said plates, closing the central part of the aperture of each bucket.

23. In an elastic-fluid turbine a disk-shaped rotating member having several concentric circular series of radially-disposed buckets, said buckets being formed by circular grooves or recesses in the side of said member and obliquely-set radially-disposed plates traversing said grooves and embedded in said member.

24. In an elastic-fluid turbine, a disk-shaped rotating member having several concentric circular series of radially-disposed buckets, said buckets being formed by circular grooves or recesses and obliquely-set radially-disposed plates each traversing all of said grooves and embedded in said member.

25. In an elastic-fluid turbine, the combination of a body-piece and a separately-formed bucket member, secured thereto and comprising a segmental circularly-recessed piece and radially-disposed plates set oblique to the surface and traversing the recess.

26. In an elastic-fluid turbine, buckets comprising a circularly-recessed piece, radially-disposed plates set oblique to the surface and traversing the recess, and a member or members closing the central portion of the aperture of said recess.

27. In an elastic-fluid turbine, a bucket formation comprising a cast-metal piece having obliquely-set radially-disposed plates cast thereinto and recesses formed between the adjacent plates, blocks interposed between the successive plates, and closing the central portion of the aperture of said buckets, and fastenings passing through the plates and blocks and securing the whole rigidly together.

28. An elastic-fluid turbine comprising a wheel having several circular series of buckets on each face, a casing surrounding said wheel and juxtaposed to the faces thereof and carrying likewise one or more concentric circular series of buckets, the latter being opposite to and between pairs of said buckets; an annular steam-chest formed in said casing; a ring of expansion-nozzles arranged to direct a current of motive fluid against the first series of wheel-buckets; ports connecting the nozzles individually with the steam-chest; individual valves adapted to close the respective ports annular receiving-chambers formed in said casing opposite to and between two adjacent series of wheel-buckets; a circular row of passage-ways adapted to conduct the fluid from the inner of said adjacent series to said receiving-chamber; a ring of secondary expansion-nozzles adapted to project the fluid in said chamber against the outer of said adjacent series; a ring of packing material between the casing and the wheel opposite said chamber and between said adjacent series of wheel-buckets; and an annular exhaust-chamber formed in said casing around the outer margin of said wheel.

29. In a multiple-expansion elastic-fluid turbine in conjunction with a wheel member, a construction for a receiving-chamber comprising a stationary member having an annular recess adjacent to the wheel, an annular block or segment closing the central part of the opening of said recess so as to leave passage-ways on each side thereof; and a series of transverse guide-plates forming partition across said chamber and passage-ways.

30. In a multiple-expansion elastic-fluid turbine in conjunction with a wheel member a construction for a receiving-chamber comprising a stationary member having an annular recess adjacent to the wheel, an annular block or segment closing the central part of the opening of said recess so as to leave passage-ways on each side thereof; and a series of transverse guide-plates cast in said block or segment and bent obliquely forward at the opening of said passage-ways, forming partitions across said chamber and passage-ways.

31. In an elastic-fluid turbine, a steam-packing between a stationary and rotating part comprising a ring of packing material set in a groove in one part, screws in said part adapted to thrust said ring forward against the other part, and other screws in the same part adapted to draw the ring back against said first-mentioned screws, whereby the ring is held rigidly in place in close juxtaposition to, but not necessarily in contact with the other part.

32. An elastic-fluid turbine, a rotating member a stationary member juxtaposed thereto, and having an annular groove, a packing-ring in said groove, screws at the back of said groove adapted to thrust said ring forward, and other screws at the back of said ring adapted to draw said ring back.

33. An elastic-fluid turbine comprising a wheel having an active surface on each side thereof, a casing juxtaposed thereto and having a circular ring of nozzles on each side of the wheel, a circular row of valves on each side governing the nozzles, a pair of regulating-rings governing the valves on the respective sides and means interconnecting the two regulating-rings, whereby they are caused to turn simultaneously, thereby opening the same number of valves on each side whereby end thrust due to unbalanced pressure is avoided.

34. An elastic-fluid turbine comprising a rotating disk and fixed envelop having inclosed guiding-passages on each, reëntrant obliquely to the plane of rotation, and so relatively located that the coördination of the passages presents a radially sinusoidal path for the fluid.

35. In an elastic-fluid turbine, rotating and fixed elements each having passages in concentric rows, and coördinated into sinusoidal paths which are respectively in planes oblique to the plane of rotation of said rotating element, and which extend radially outward from the center of rotation, the passages in succession from the center out being longer and longer radially, wider and wider circularly, and deeper and deeper obliquely to the plane of rotation.

36. In an elastic-fluid turbine, the combination of a rotating member having concentric circular rows of inclosed passages reëntrant obliquely to the plane of rotation of the rotating member, each passage being adapted to guide the elastic fluid radially outward from the axis of rotation, and successively forward and backward with respect to the direction of rotation of said member, and a stationary member having concentric circular rows of ports, each port serving to guide the elastic fluid from the exhaust end of one of the passages first named in one circular row, to the admission end of one of the passages in the next row on the rotating member, the admission ends being nearer the axis of rotation than the exhaust ends, and the two ends of any passage being about radially in line with each other.

37. An elastic-fluid turbine, comprising a shaft, a disk thereon, whose axis is the axis of said shaft, and rows of reëntrant guiding inclosed passages for the fluid, at different distances from said axis, any one of said passages extending first inwardly from one side of said disk toward the other side thereof, and at the same time obliquely of both of said sides and of the axis of said disk, and secondly, toward the first-named side from the second-named side of said disk, and at the same time both obliquely of said axis and of said sides.

38. In an elastic-fluid turbine, a discoid rotating body having formed on one face thereof a plurality of circular series of reëntrant buckets, the buckets having their openings radially disposed and the buckets in the several series being disposed in radial ranks, the openings of a bucket in each series on one radial line; and means for directing a current of impelling fluid against the innermost series, receiving it therefrom and redirecting it against the next outer series, and so on to the outermost series.

39. In an elastic-fluid turbine, a discoid rotating body having formed on one face thereof a plurality of circular series of reëntrant buckets, the buckets having their openings radially disposed and the buckets in the several series being disposed in radial ranks, the openings of a bucket in each series on one radial line; an envelop having a face coöperating therewith and in juxtaposition thereto and having thereon similar circular series of reëntrant buckets, the latter being disposed likewise in radial ranks coinciding with those of said rotating body; and means for directing a current of impelling fluid against the innermost side of the innermost rotating buckets, which current is reflected back and forth passing radially outward to the outer ends of the outermost rotating buckets.

Signed this 20th day of May, 1904.

WILLIAM E. SHEPARD. [L. S.]

Witnesses:
ALEXIS GAVARD,
J. B. H. DU FRESNE.